Dec. 17, 1935.  P. E. KLOPSTEG  2,024,230
DISPLACEMENT AND ACCELERATION APPARATUS
Filed May 16, 1929  4 Sheets-Sheet 1

Inventor
Paul E. Klopsteg
By Wilson, Mann, & Cox, Attys

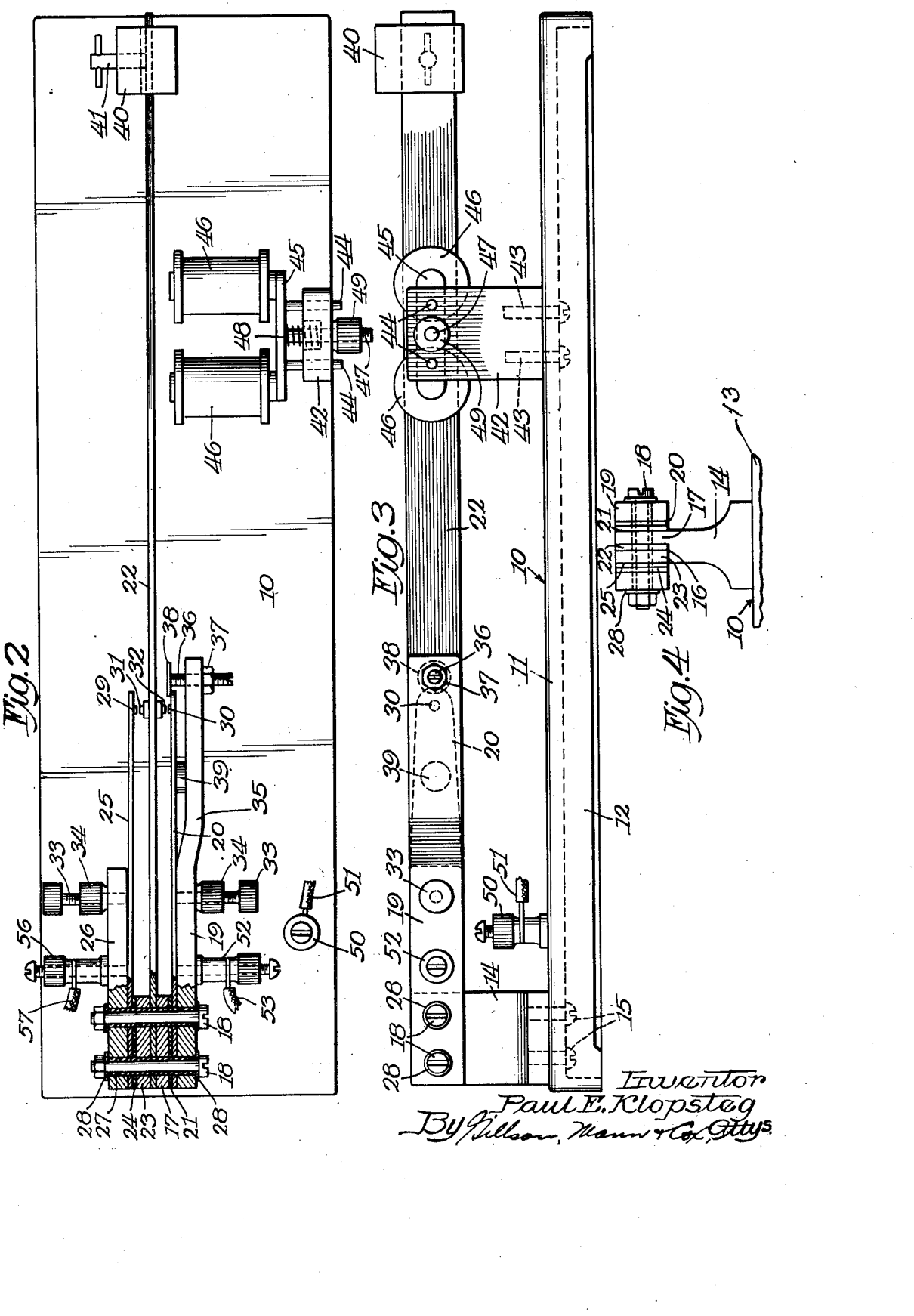

Dec. 17, 1935. P. E. KLOPSTEG 2,024,230
DISPLACEMENT AND ACCELERATION APPARATUS
Filed May 16, 1929 4 Sheets-Sheet 3
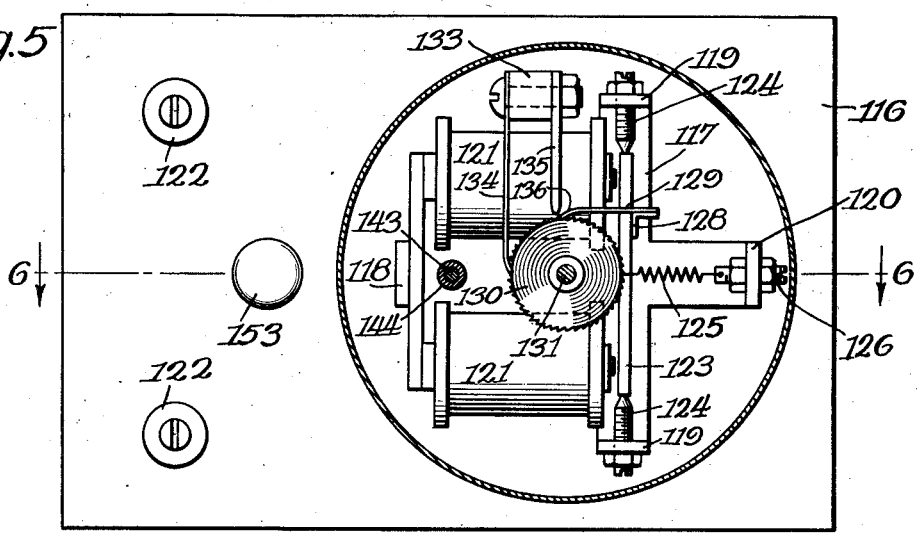
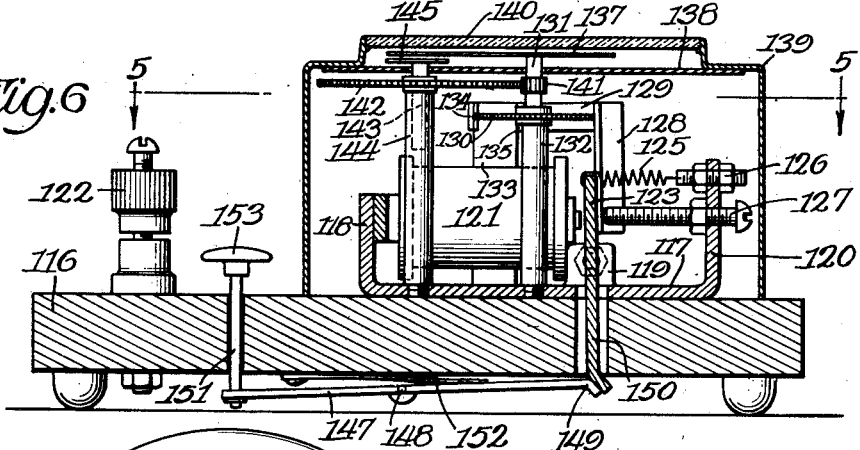
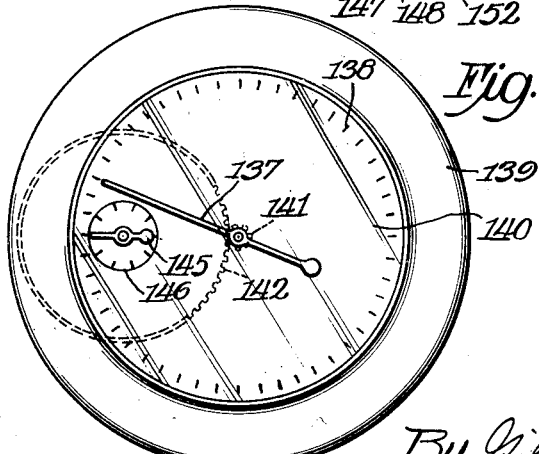
Inventor
Paul E. Klopsteg Dec. 17, 1935.  P. E. KLOPSTEG  2,024,230
DISPLACEMENT AND ACCELERATION APPARATUS
Filed May 16, 1929  4 Sheets-Sheet 4
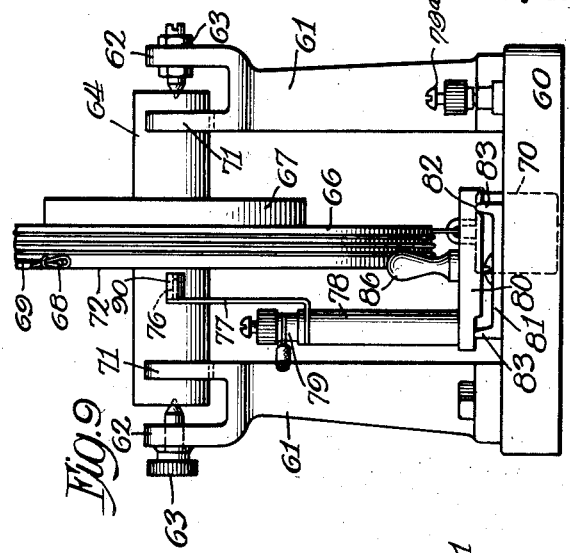
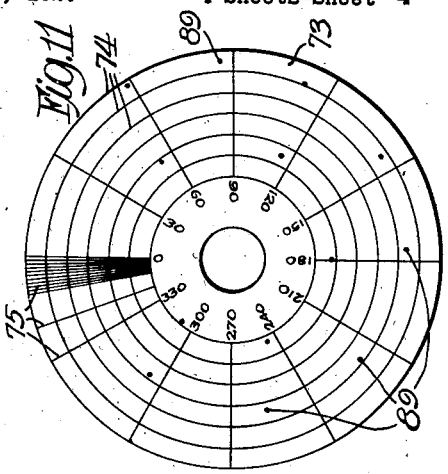
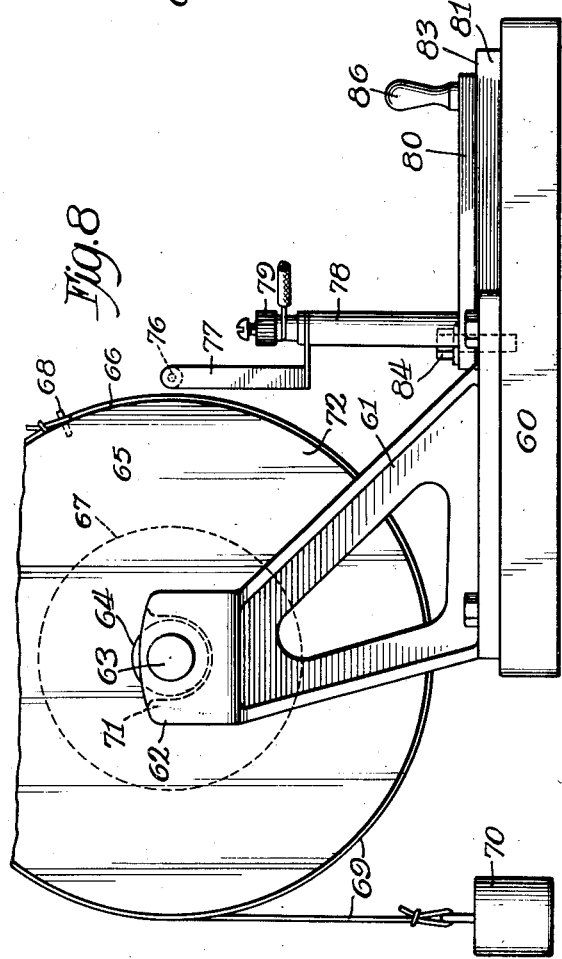
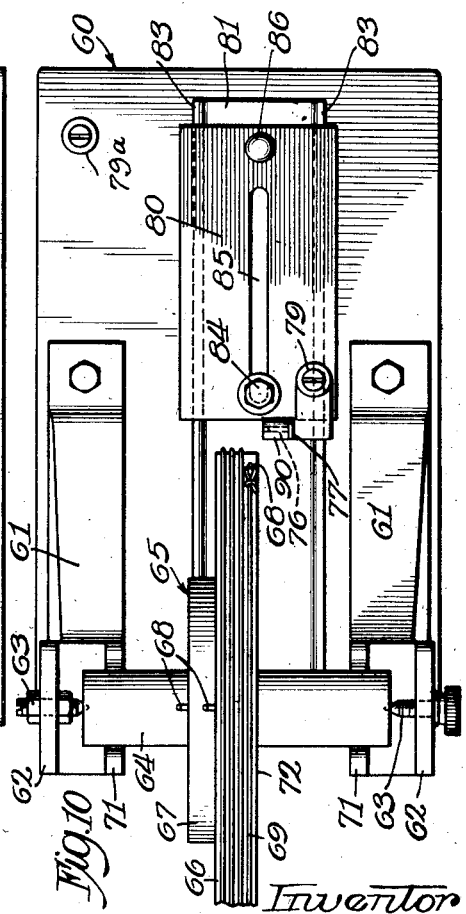

Patented Dec. 17, 1935

2,024,230

UNITED STATES PATENT OFFICE 2,024,230

DISPLACEMENT AND ACCELERATION APPARATUS

Paul E. Klopsteg, Chicago, Ill., assignor to Central Scientific Company, a corporation of Illinois Application May 16, 1929, Serial No. 363,688

10 Claims. (Cl. 73—51)

This invention relates to apparatus for studying the displacement and acceleration of masses under the action of forces and teaching the laws governing the same; and it has, among its principal objects, to produce permanent records of experimental data that may form a part of the student's report, and will encourage thorough performance of the work assigned; to eliminate the use of special apparatus for reading the records obtained, and simplify the reduction of the records to numerical data; to reduce the time of making experimental determinations, thereby giving each student more time for work on the physical principles of the experiment, and enabling more students to use the same apparatus in a given period; to eliminate physical errors of recording and other errors of reading records of experiments; to produce improved means for delivering sparks at constant intervals and with uniform accuracy and generally to eliminate shortcomings in prior apparatus of this class.

Further objects and advantages of the invention will become apparent as the disclosure proceeds and the description is read in connection with the accompanying drawings in which Fig. 1 is a diagram illustrating the application of the fundamental principles to a moment of inertia machine, inclined plane and horizontal plane acceleration and velocity devices, and an Atwood machine for determining the laws of falling bodies;

Figs. 2, 3 and 4 are respectively plan, side elevation and end elevation of the preferred form of a spark timer, forming a part of the general organization;

Fig. 5 is a plan view with the cover removed, of the preferred form of an impulse counter used in connection with the spark timer;

Fig. 6 is a vertical section taken on the line 6—6 of Fig. 5;

Fig. 7 is a plan view of the cover of the impulse counter shown in Figs. 5 and 6;

Fig. 8 is a side elevation of the preferred embodiment of a moment of inertia machine;

Figs. 9 and 10 are end elevation and plan views respectively of the same; and

Fig. 11 is a plan view of a polar co-ordinate chart illustrating the record made with the apparatus including the moment of inertia machine, shown in Figs. 8, 9 and 10.

Figure 1:
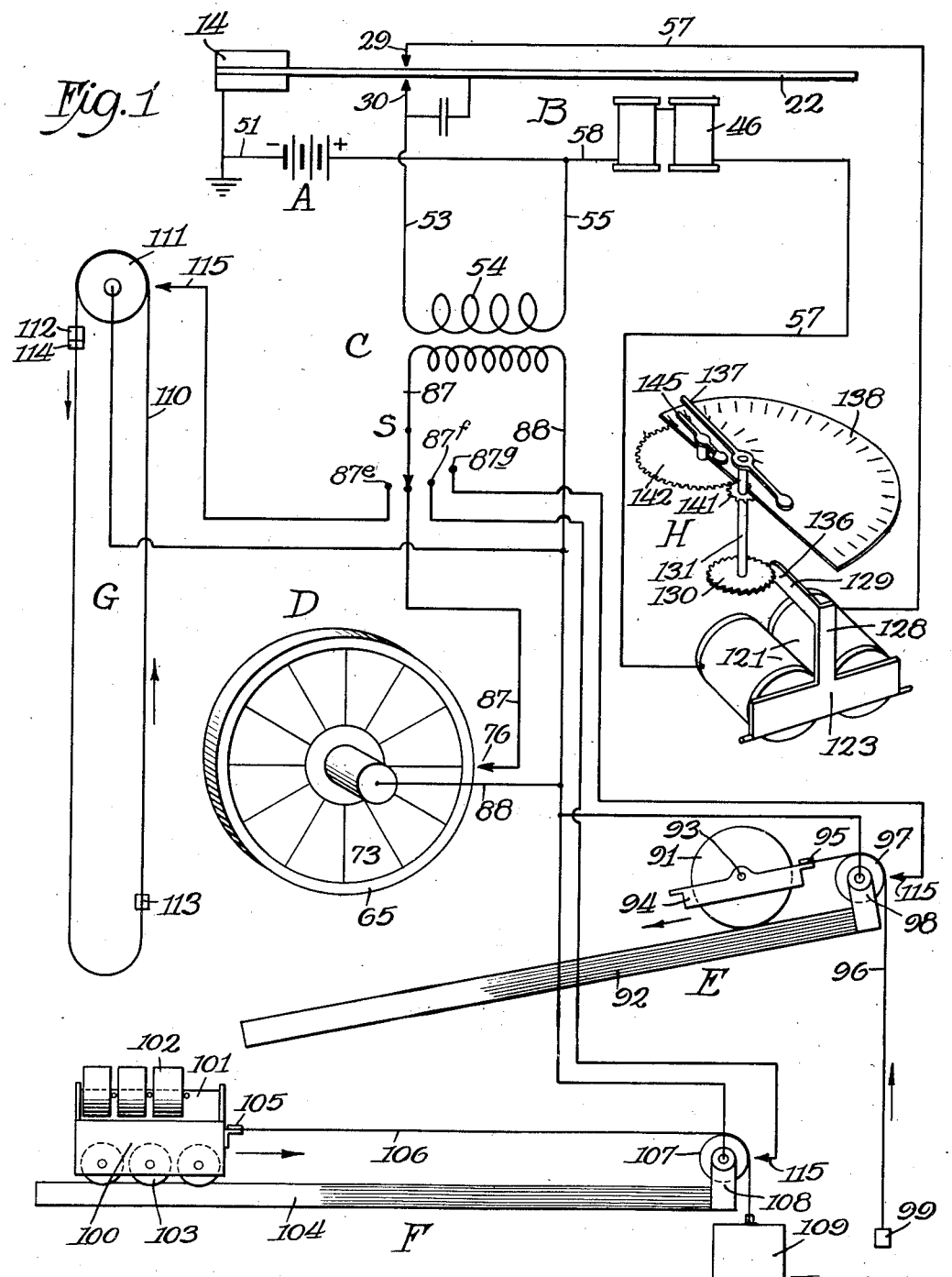

But this specific illustration and the correspondingly specific description are used for the purpose of disclosure only, and it is realized that the substance of the invention may be embodied in other forms and put to other applications.

The general organization illustrated in Fig. 1 includes a source of current represented by the battery A, a spark timer indicated generally by B, (illustrated in detail on sheet 2), which opens the primary circuit of a spark coil, indicated generally by C, the secondary of which delivers sparks to a record receiver associated with a moment of inertia machine, generally indicated by D, (illustrated in detail on sheet 4), an inclined plane acceleration device, indicated generally by E, a horizontal plane velocity device, indicated generally by F, and an Atwood machine for determining the laws for falling bodies, indicated generally by G; and associated with the spark timer B, is an impulse counter, generally indicated by H (illustrated in detail on sheet 3).

Spark timer

The spark timer has a massive base 10, comprising a web 11, side flanges 12, and end flanges 13. A stout bracket 14 is secured to the web adjacent to one end by screws 15, and is cut away adjacent to the top (Fig. 4), as indicated at 16, to leave a flat upstanding arm 17, perforated to receive bolts 18 which secure to it (Fig. 2) a rigid arm 19, a resilient arm 20, an insulating plate 21, a vibrating bar 22, a filler block 23, an insulated plate 24, a resilient arm 25, and a rigid arm 26. The bolts 18 are also equipped with insulating tubes 27 and insulating washers 28.

Adjacent to their free ends the resilient arms 20 and 25 are equipped with tungsten contacts 29 and 30 adapted to cooperate with similar contacts 31 and 32 carried by the vibrating bar 22.

The rigid arms 19 and 26 are equipped with adjusting screws 33, the points of which bear on the resilient arms 20 and 25 respectively, to adjust the position of the contacts 29, 30 and the adjusted positions may be made secure by the lock nuts 34.

The rigid arm 19 is projected beyond the free end of the arm 26, bent laterally at 35, and equipped at its free end with an adjusting screw 36 having a check nut 37, and a flat head 38, adapted to form a positive limit to upward movement of the contact 30 in Fig. 2. The arm 19 is also fitted with a yielding pad 39 adapted to damp vibrations of the resilient arm 20.

One or more slotted loading masses 40 may be mounted on the bar 22 and secured in adjusted position by screws 41 to vary the period of vibration of the bar.

A second bracket 42 is secured to the web adjacent the right end in Figs. 2 and 3 by screws 43, and is perforated to receive rods 44, carried by the base 45 of electromagnets 46. The base 45 is also equipped with a screw 47 passing through a helical spring 48 and the bracket 42, and equipped with a thumb nut 49 by which the position of the magnet may be adjusted.

A binding post 50 on the base 10 is electrically connected with the bar 22 through the bracket 14, and may be connected by a wire 51 (Fig. 1) with one side of the battery A. A binding post 52 on the arm 19 (Fig. 2) may be connected by a wire 53 (Fig. 1) with the primary 54 of the spark coil C which, in turn, may be connected by a wire 55 with the opposite side of the battery A. With such connections, it will be clear that downward movement of the bar 22 in Fig. 2 will bring the contacts 30 and 32 together to close the circuit through the battery A, and the primary 54, which circuit will remain closed until, on the reverse movement of the bar 22, the resilient arm 26 is positively stopped by the head 38, when the circuit is broken, with the familiar results in the secondary and any circuit including it.

A third binding post 56 (Fig. 2) may be connected by a wire 57 (Fig. 1) directly or indirectly with the windings of the magnets 46 which, in turn, may be connected by a wire 58 to the battery A. With such connections, it will follow that upward movement of the bar 22, in Fig. 2, will close the contacts 31 and 29, and thereby close the circuit through the battery A and the magnet 46 energizing the latter, and giving a downward impulse to the bar 22. It will also follow that on the opposite phase of the bar's vibration, the circuit through the driving magnet 46 will be closed, causing the bar to return and complete the oscillation.

The adjustability of the magnet 46 with respect to the bar and the adjustability of the contacts 30 and 29 with respect to the contacts 31 and 32 enables the user to secure absolutely reliable operation without cut and try methods.

Rotational inertia machine

A massive base 60 has fitted to one end portion a pair of brackets 61 having at their upper ends arms 62 equipped with precision pivot bearings 63 for the shaft 64 of an inertia disk 65 of simple geometric form presenting a large cylindrical surface 66, and a smaller cylindrical surface at one side 67. Each of these surfaces, and the shaft 64, is provided with a pin 68 for cooperation with the loop of a thread 69 adapted to be wound on a selected one of the cylindrical surfaces, and attached to a driving weight 70 by which the inertia disk is propelled.

The brackets 61 incline to the left in Fig. 8 a sufficient amount to permit the thread 69, when wound on the shaft 64, to hang clear of the left end of the base 60, and therefore, of a table or other suitable support upon which the machine is placed.

The brackets 61 have notched arms 71 spaced inwardly from the pivot bearings to give the shaft 64 temporary support during the operation of mounting and dismounting the disk.

The left face 72 of the inertia disk 65, as it appears in Fig. 9, is flat, and a polar coordinate chart or record receiving means 73 is temporarily secured thereto by a few spots of rubber cement, or the like. The chart is provided with a plurality of circles 74 and radial graduations in degrees, or fractions thereof, 75, printed or otherwise imposed on a sheet having a coating more sensitive to or which is affected to a greater extent by a spark than is the base sheet. The best material is in common use as a substitute for carbons in making copies on a typewriter, and comprises a colored paper base coated on one side with paraffin which latter is so affected by the spark as to make a sort of wide halo about the perforation in the paper. Carbon coated paper and a variety of other sheets may be used with like results.

A spark point 76 is supported for movement along a radius of the inertia disk by an arm 77 fixed to a bakelite column 78 by a binding post 79. The column 78 is carried by a slide 80 mounted on a channel bar track 81 fixed to the base 60. The under side of the slide 80 has grooves 82 to receive the flanges 83 of the track and a bolt 84 passing through a slot 85 in the slide, and secured to the base 60, serves to hold the slide and track in proper relation. The slide is equipped with a suitable handle 86 to facilitate movement back and forth on the track.

The binding post 79, and, therefore, the spark point 76, may be connected with the secondary of the coil C by a wire 87 (Fig. 1), and the secondary, in turn, may be connected by wire 88 with the binding post 73ª on the base 60. As the base 60, brackets 61 and inertia disk 65 are all made of conducting material, an electrical circuit is completed through the secondary of the coil except for the air gap between the spark point 76 and the disk 65.

From the foregoing description of the spark timer and its connections, it will follow that sparks will be delivered across the gap between the point 76 and inertia disk 65 at uniform intervals and will perforate the chart or record receiving means 73.

Therefore, if the disk is set in motion by the force of gravity acting on the weight 70, and the slide 80 is moved to the left in Fig. 8, a series of perforations 89 (Fig. 11) in the chart or record receiving means 73 will be made in the form of a spiral, and, with the aid of the graduations on the chart, this record can be readily reduced to numerical data.

Spark point

It is, of course, of the utmost importance that the sparks travel in a direct line and by the shortest path from the end of the spark point to the inertia disk. This is accomplished by fitting the point with a hollow shell, or skirt, 90, of some suitable nonconducting material, such as glass, bakelite, hard rubber, etc. and making the skirt project a suitable distance beyond the delivery end of the point and towards the disk. This absolutely prevents lateral movement of the spark and directs it straight from the end of the point to the disk. Capillary glass tubing enclosing a short piece of wire and brought close to the chart gives excellent results.

Inclined plane and car acceleration device

This device, shown generally at E, includes a massive roller 91 adapted to travel down an inclined track 92, and having trunnions 93 mounted in a frame 94 equipped with a clamp 95 for making the frame fast to one end of a record strip or record receiving means 96 running over a metallic roller pulley 97, mounted in the bracket 98 at the end of the track 92, and having a light weight 99 attached to its free end to insure proper cooperation with the pulley 97.

Horizontal plane and car device

This device, shown generally at F, includes a 75 car 100, having a blade 101 to receive loading weights 102, is equipped with wheels 103 running on a horizontal track 104, and has a clamp 105, adapted to grasp one end of a record strip or record receiving means 106, running over a metallic roller pulley 107 mounted in a bracket 108 at the end of the track 104, and having attached to its free end a driving weight 109.

Atwood machine for determining the laws of falling bodies

This device shown generally at G, includes a record strip 110 in the form of a closed loop running over a roller pulley 111, and equipped at separated points with balancing weights 112, and 113, one of which is augmented by the addition of a driving weight 114.

In each of the devices E, F and G, the roller pulley (97, 107 and 111) is connected by suitable extensions of the wire 88 with one side of the spark coil, and a spark point 115 adjacent to each of those pulleys is connected through a selective switch S with a suitable branch 87e, 87f, or 87g of the wire 87 with the other side of the spark coil C.

With such connections, it follows that as the record strips move over the roller pulleys, the sparks will make a series of perforations spaced in proportion to the time of travel between successive sparks. By making the spark point radially adjustable with respect to the inertia disk 65 (see Figs. 8 and 11), it becomes possible to make a plurality of records on the same chart or record receiving means.

Impulse counter and stop watch timer

A base 116 is equipped with a metal stamping 117 provided with upturned arms 118, 119, 120. The arm 118 carries the coils 121 of an electromagnet which are connected with binding posts 122 carried by the base 116.

The armature 123 is mounted to rock on pivot bearings 124, carried by the arms 119, and is constantly urged to the right in Fig. 6, by a spring 125 adjustably connected at 126 to the arm 120, which also carries an adjustable stop 127 for limiting the rotation of the armature away from the magnet.

The armature is equipped with an arm 128, carrying a driving pawl 129, adapted to cooperate with a ratchet 130, fixed to a shaft 131, journaled in the hollow post 132, made fast to the stamping 117 and the base 116. A post 133 (Fig. 5) on the base 116 carries a holding pawl 134 and a stop finger 135 for the driving pawl 129.

The binding posts 122 which are suitably insulated from each other may be inserted in the wire connection 57 of Fig. 1, or may be substituted for the binding posts of the primary of the spark coil C. In either case, the windings 121 will be intermittently energized, and cooperate with the spring 125 to give the armature a rocking motion.

As the armature rocks to the left in Figs. 5 and 6, the curved end 136 of the pawl 129 drives the ratchet counter-clockwise until the curved end strikes the stop finger 135, which checks the motion of the pawl, and, therefore, the armature, and also locks the pawl to the ratchet to prevent the latter overrunning. Each oscillation of the armature will, therefore, move the ratchet one tooth, and the pawl 134 will hold the ratchet while the armature rocks to the right.

The shaft 131 is equipped with a needle or pointer 137 (Fig. 7) running over a suitable scale 138, carried by the casing 139, and visible through the crystal 140.

The shaft 131 is also equipped with a pinion 141 meshing with a gear 142 on a shaft 143 journaled in a hollow column 144 fixed to the base 116. The shaft 143 is also equipped with a shorter needle, or pointer 145 running over a smaller scale 146, also visible through the crystal 140.

A lever 147 fulcrumed at 148 on the bottom of the base 116 has a wedge 149 adapted to control the armature by engagement with the arm 150 thereon which projects downwardly through a slot in the base. The end of the lever 147 opposite to the wedge 149 is pivoted to a push rod 151 loosely in the base 116 and normally held in a raised position by a spring 152; and this rod 151 is equipped with a finger piece 153 at a convenient height above the base.

Operation

With the rotational inertia machine, set up substantially as illustrated in sheets 1 and 4, and a chart 73, secured to the face 72 of the disk 65 with several patches of rubber cement; the spark timer is set in motion, the driving weight 70 is applied while holding the disk stationary; the disk is released and the slide 80 is pushed to the left in Figs. 8 and 10, moving the spark point 67 radially of the disk while the latter rotates.

The disk, with its shaft 64, is removed from the pivot bearings, and stood on the right end, as it appears in Fig. 9. In this position, the chart may be conveniently loosened and removed, or it may be allowed to remain on the disk while, with the aid of the graduations 75, the distances between the successive perforations are read off and reduced to numerical data.

The disk and its shaft are then measured for other numerical data, and the usual calculations are performed.

The operation with the devices E, F and G, are, in all respects, similar, and will be obvious without detailed explanation.

In all these experiments compensation for friction can readily be made by applying weight to the system until uniform motion ensues, obtaining a spark record, reducing it to numerical data by suitable measurements and making a corresponding correction on the other charts made.

The period of time corresponding to a chart record, including any number of sparks is best ascertained by the spark timer.

For any given adjustment of the spark timer, the impulse counter must be rated with some standard such as a stop watch or the second hand of any timepiece. This may be accomplished by releasing the controller of the impulse counter as the second hand passes a selected position and stopping it when the hand passes another selected position several minutes later.

A skillful operator can stop the impulse counter at zero on the scale, and anyone can set it at zero by using the control lever to rock the armature manually until the pointer arrives at zero.

With either of the connections suggested, the magnet of the impulse counter is energized for each spark and, therefore, gives a readily visible indication either actually or substantially at the same instant.

The invention makes possible, for the first time, that winning simplicity of means and procedure, and that convincing accuracy of experimental data so necessary to the instruction of average students in fundamental laws.

The variable and indeterminate friction of a tuning fork stylus on the recording surface, the uncertain frequency of vibration, the value of which the student must usually accept on faith, the tedious counting of undulations, and in fact, all objections to the tuning fork methods are eliminated.

The easily visible spots formed on the chart by the sparks simultaneously with the minute perforations therein result in a graphic record that can be reduced to numerical data by the student, and checked by the instructor with equal ease.

The steel bar electrically maintained in vibration by an incident in those vibrations, and making and breaking a circuit through the primary of a spark coil, is obviously a most simple and accurate source of timed sparks.

A selection of bars with adjustable masses, and a driving magnet, adjustable either in position or magnetic intensity, gives a wide range of selective vibration.

The impulse counter enables the student, with the aid of a stop watch, to accurately determine for himself the time corresponding to a selected number of vibrations, or spark intervals, which is important, both because the interval is a squared quantity in all acceleration formulae, and because the student is not asked to accept this basic quantity on faith.

When the spark timer and the impulse counter have been rated with a stop watch, they become a high-speed electrical stop watch useful wherever short intervals are to be measured.

I claim as my invention:

1. In apparatus of the class described, a mass whose motion is to be recorded, a spark sensitive record receiver moving with the mass, means to deliver sparks to the receiver at equal intervals of time including a vibrating bar, a circuit opened by the bar, and means operated by the bar for counting the sparks.

2. In apparatus of the class described, a mass whose motion is to be recorded, a spark sensitive record receiver moving with the mass, means to deliver sparks to the receiver at equal intervals of time including a vibrating bar, a circuit opened by the bar, and an electro-magnet means for counting the sparks including a circuit closed by the bar at each vibration.

3. In apparatus of the class described, a moment of enertia machine including a rotary mass whose motion is to be measured, a thin, colored, substantially circular, record chart rotating with the mass and coated on one side with paraffin, and means for perforating the chart with sparks at uniform intervals of time.

4. In apparatus of the class described, a moment of inertia machine including a massive base, an inertia disk, and means for rotatably mounting the inertia disk on the base including brackets having bearings for the disk at a horizontal distance from one end of the base less than the radius of the disk.

5. In apparatus of the class described, a moment of inertia machine including an inertia disk of conducting material, means for mounting the disk to rotate, a record chart detachably mounted on and rotating with the disk, and means to deliver sparks through the chart at uniformly spaced intervals.

6. In apparatus of the class described, a moment of inertia machine including an inertia disk of conducting material, means for mounting the disk to rotate, a record chart detachably mounted on and rotating with the disk, and means to deliver sparks through the chart at uniformly spaced intervals, including a spark point, and means for moving the spark point radially with respect to the chart.

7. An apparatus of the class described comprising a movable mass whose motion is to be measured, gravity actuated means for moving the mass, record-receiving means movable by the mass, marking means for passing sparks through the record-receiving means including a spark point adjacent to which the record-receiving means moves, said spark point being adapted to be moved across the record-receiving means during the movement thereof, and means for delivering said sparks at equal intervals of time.

8. An apparatus for recording the movement of a mass, the inertia of which is to be measured, comprising a stationary support, a mass mounted directly upon and movable relatively to said support, an electric circuit having a pair of terminals, one of said terminals being part of said mass, the other terminal being spaced from the first terminal to form a spark gap, a record-receiving element disposed in the spark gap, said record-receiving element and second terminal, respectively, being relatively movable, one being fixed and the other connected to move with the mass, means for moving said mass comprising a weight and a flexible connection between the weight and mass, and means for opening and closing said circuit for delivering sparks to said record-receiving means at equal intervals of time.

9. In apparatus of the class described, a moment of inertia machine including a base, an inertia disk, means for rotatably mounting the inertia disk on the base including supports having bearings for the disk, and means for rotating the disk including a flexible member having one end portion movable with the disk and having its other end portion weighted and depending, the base being formed to provide clearance for said weighted end portion.

10. In apparatus of the class described, a moment of inertia machine including a base, a rotatable inertia disk adapted to carry a record receiving member, bearing supports for the disk carried by the base, means for applying a constant force to the disk to rotate the same comprising a flexible member having one end portion movable with the disk and its other end portion carrying an energizing weight and adapted to depend by gravity, the base being formed to provide clearance for the depending portion of the flexible member, and electrically operated means adapted to mark the record receiving member in equal intervals of time for furnishing data from which the inertia of the disk may be calculated.

PAUL E. KLOPSTEG.